US012619507B2

(12) United States Patent (10) Patent No.: US 12,619,507 B2
Kaundinya et al. (45) Date of Patent: May 5, 2026

(54) METHOD FOR SEAMLESS FAILBACK AFTER UNPLANNED FAILOVER

(71) Applicant: Confluent, Inc., Mountain View, CA (US)

(72) Inventors: Sanjana Kaundinya, Cupertino, CA (US); Chern Yih Cheah, Seattle, WA (US)

(73) Assignee: Confluent, Inc., Mountain View, CA (US)

( * ) Notice: Subject to any disclaimer, the term of this patent is extended or adjusted under 35 U.S.C. 154(b) by 0 days.

(21) Appl. No.: 18/912,315

(22) Filed: Oct. 10, 2024

(65) Prior Publication Data

US 2026/0104974 A1 Apr. 16, 2026

(51) Int. Cl.
*G06F 11/00* (2006.01)
*G06F 11/20* (2006.01)

(52) U.S. Cl.
CPC ................................. *G06F 11/2033* (2013.01)

(58) Field of Classification Search
CPC ............... G06F 11/2023; G06F 11/203; G06F 11/2033; G06F 11/2069; G06F 11/2092; G06F 11/1675; G06F 11/1658; G06F 11/1662
See application file for complete search history.

(56) References Cited

U.S. PATENT DOCUMENTS

| | | | |
|---|---|---|---|
| 6,338,126 B1 * | 1/2002 | Ohran | G06F 11/2082 |
| | | | 714/E11.107 |
| 8,028,192 B1 * | 9/2011 | Kekre | G06F 11/203 |
| | | | 714/13 |
| 10,649,862 B1 * | 5/2020 | Sure | G06F 3/065 |
| 2006/0095478 A1 * | 5/2006 | Cherkauer | G06F 11/2097 |
| 2024/0281413 A1 * | 8/2024 | Kashi Visvanathan | |
| | | | G06F 11/1417 |

* cited by examiner

*Primary Examiner* — Marc Duncan

(74) *Attorney, Agent, or Firm* — Schwegman Lundberg & Woessner, P.A.

(57) ABSTRACT

Systems and methods are directed to seamless failback after an unplanned failover. The method involves executing a truncate-and-restore command on a primary topic of a primary cluster, performing checks on a secondary topic to ensure it is a mirror topic in a stopped state with valid identifiers and offsets, and transitioning the primary topic to immutable state. The method further includes comparing sequence numbers to ensure safe truncation, truncating partitions to match the secondary topic's log end offsets, and clamping consumer group offsets. The primary topic is then converted to a mirror state, enabling active mirroring. A reverse command is then executed to complete the failback process, restoring the primary topic to a writable state.

18 Claims, 9 Drawing Sheets

METHOD FOR SEAMLESS FAILBACK AFTER UNPLANNED FAILOVER

TECHNICAL FIELD

The subject matter disclosed herein generally relates to data storage technologies. Specifically, the present disclosure addresses systems and methods for seamless failback after an unplanned failover.

BACKGROUND

An unplanned failover occurs when a primary cluster experiences an outage, in which case, all applications have to failover to a secondary cluster. Once the primary cluster becomes operational again, a solution is needed to allow a user to mirror back and synchronize any data that was written to the secondary cluster during the outage. Traditionally, mirror topics and cluster links are deleted and recreated, sometimes twice-once to copy the data back to the primary cluster, and once more to re-copy the data to the secondary cluster. This results in significant operational overhead which may not be acceptable due to various constraints.

BRIEF DESCRIPTION OF THE DRAWINGS

Some embodiments are illustrated by way of example and not limitation in the figures of the accompanying drawings.

DETAILED DESCRIPTION

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example embodiments provide a failback process to a primary cluster after an unplanned failover using a sequence of operations that does not require the deletion and recreation of mirror topics and cluster links. It is important that the failback results in little data loss and minimal disruption including minimizing an amount of time events cannot be produced or consumed.

Thus, example embodiments address the technical problem of how to efficiently failback after an unplanned failover. To address the technical problem, example embodiments provide a technical solution that utilizes a truncate-and-restore command to trigger a sequence of operations to be performed on both the primary and secondary clusters. The sequence of operations include performing a check of a secondary topic of the secondary cluster to ensure it is a mirror topic in a stopped mirror state that has a source topic identifier that is the same as a local topic identifier of a primary topic of the primary cluster and that the secondary topic has valid stopped log end offsets. Additionally, a check is performed that a stopped sequence number associated with the primary topic is lower than a stopped sequence number associated with the corresponding secondary topic. Assuming all these checks are verified/valid, the primary topic is truncated to the corresponding stopped log end offsets of the secondary topic and begins mirroring new data from the secondary topic. When mirror lag is zero (or close to zero), a reversal operation is executed that reverses the direction of the mirroring and completes the failback.

Advantageously, by using the technical solution, example embodiments synchronize the topics in the primary and secondary clusters before the reversal operation. As a result, computation overhead is reduced since there is no need to delete and recreate mirror topics and cluster links. These advantages will become apparent in the detailed description below.

Figure 1:
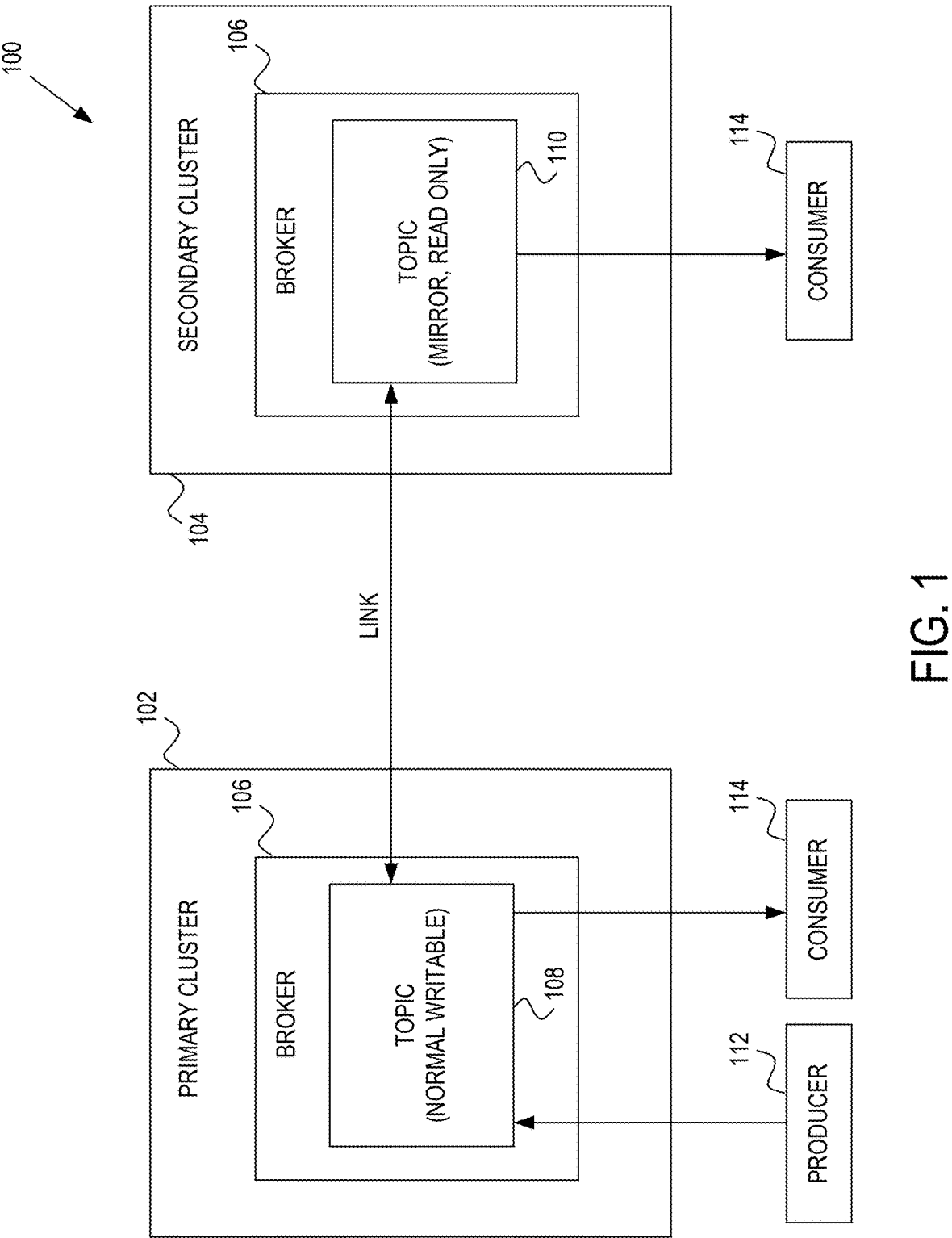
FIG. 1 is a diagram illustrating a high-level distributed streaming architecture in which unplanned failover and failback can occur, in accordance with example embodiments.

FIG. 1 is a diagram illustrating a high-level distributed streaming architecture 100 in which unplanned failover and failback can occur, in accordance with example embodiments. The distributed streaming architecture 100 provides a distributed streaming platform used to stream processes, applications, and data. The embodiment of FIG. 1 illustrates the distributed streaming architecture 100 operating under normal conditions before an unplanned failover.

In example embodiments, the distributed streaming architecture 100 comprises a primary cluster 102 and a secondary cluster 104. In one embodiment, the primary cluster 102 can be on-premises of a user (e.g., customer), while the secondary cluster 104 is located in the cloud. In alternative embodiments, both the primary cluster 102 and the secondary cluster 104 are on the cloud, both the primary cluster 102 and the secondary cluster 104 are on-premise, or the primary cluster 102 is on the cloud and the secondary cluster 104 is on-premise. The primary cluster 102 and the secondary cluster 104 are communicatively coupled via one or more networks or link(s). The networks can include, for example, a wide area network (WAN), the Internet, or another packet-switched data network.

In example embodiments, the primary cluster 102 and the secondary cluster 104 both comprise one or more brokers 106. In some cases, the brokers 106 are a network of machines (e.g., servers). In other cases, the brokers 106 are containers running on virtualized servers on processors in a datacenter or a combination of the machines and containers.

The brokers 106 are configured to run a broker process in order to handle requests from clients and keep data replicated/mirrored. Specifically, each broker 106 can host a plurality of partitions associated with topics (e.g., primary topic 108 and secondary topic 110), handle incoming requests to write new events to those partitions in the topics, read events from the partitions, and/or handle replication of partitions. Each topic 108 and 110 is a unit of organization that groups similar records/data together (e.g., by category). Thus, the topics 108 and 110 act as a container to hold similar events. The partition is the smallest storage unit holding a subset of records or data for a particular topic 108 and 110. Any number of topics can be located within each broker 106 and 108.

Each broker 106 has a network server that accepts connections on one or more listeners and allocates each connection to a processor from its pool of processors. A selector associated with the assigned processor handles all traffic on the connection using non-blocking input/output. The state of each connection is stored in a channel managed by the selector.

The clients (e.g., producer 112, consumer 114) connect to the brokers 106 on one of the advertised listeners. The clients are configured with security configurations to authenticate with the broker 106 for the security protocol used by the listener. A network client used by the client has its own selector that establishes connections and processes traffic to/from the brokers 106. A state of each connection is stored in a channel managed by the selector of the network client.

For a typical flow (e.g., to obtain metadata), the client establishes a connection to the broker 106 and initiates authentication flow. If authentication fails, the connection is terminated by the broker 106. Otherwise, the channel moves to a ready state and the broker 106 starts processing requests arriving on the channel. On each channel, the client sends requests and the broker 106 processes a request, sends a response to the request, and then reads the next request.

The producer 112 is configured to produce new data and send the new data (e.g., new records) to the broker 106 in the primary cluster 102, which is the production cluster in normal operations. In some embodiments, the producer 112 comprises a client application that is a source (e.g., publishes, streams) of the events. In some embodiments, the producer 112 streams or publishes the new data to the broker 106 in the primary cluster 102 in real-time.

The consumer 114 is configured to consume data (e.g., batches of records) from one or more topics 108 or 110 of the brokers 106. More particularly, the consumer 114 is an end-user or application that retrieves data from the primary cluster 102 or the secondary cluster 104. In some embodiments, the consumer 114 subscribes to respective topics 108 or 110 in order to read and process data from the respective topics 108 or 110.

Thus, the primary cluster 102 receives the new data from the producer 112 and stores the new data in its respective topics 108. Because of the desire to have data accessible from both the primary cluster 102 and the secondary cluster 104, the new data is replicated (e.g., mirrored) by the secondary cluster 104 from the primary cluster 102. In example embodiments, this is done by the secondary cluster 104 reaching out to the primary cluster 102 over the link (e.g., network) and mirroring the data into corresponding topic 110 at the secondary cluster 104. Thus, the secondary cluster 104 is a mirror cluster in FIG. 1.

In example embodiments, any of the components shown in, or associated with, FIG. 1 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system, device, or machine. For example, a special-purpose computer system able to implement any one or more of the methodologies described herein is discussed below with respect to FIG. 9, and such a special-purpose computer is a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Moreover, any of the components illustrated in FIG. 1 or their functions may be combined, or the functions described herein for any single component may be subdivided among multiple components. Additionally, any number of brokers 106 may be embodied within the primary cluster 102 and/or the secondary cluster 104. While only a single primary topic 108 and a single secondary topic 110 are shown, example embodiments can comprise any number of primary topics 108 in the primary cluster 102 and any number of secondary topics 110 in the secondary cluster 104.

Figure 2:
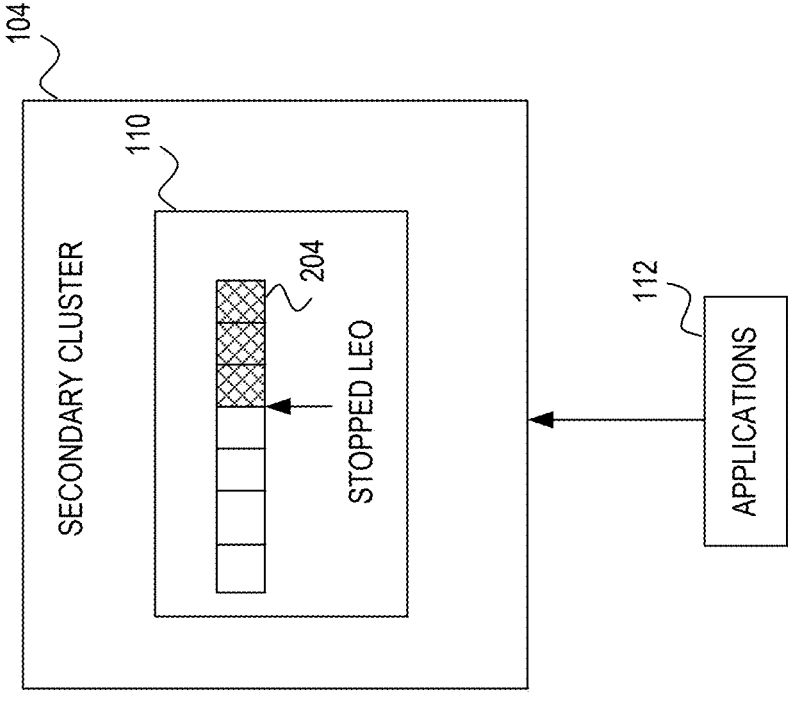
FIG. 2 illustrates the distributed streaming architecture in the unplanned failover stage, in accordance with example embodiments.
Figure 2:
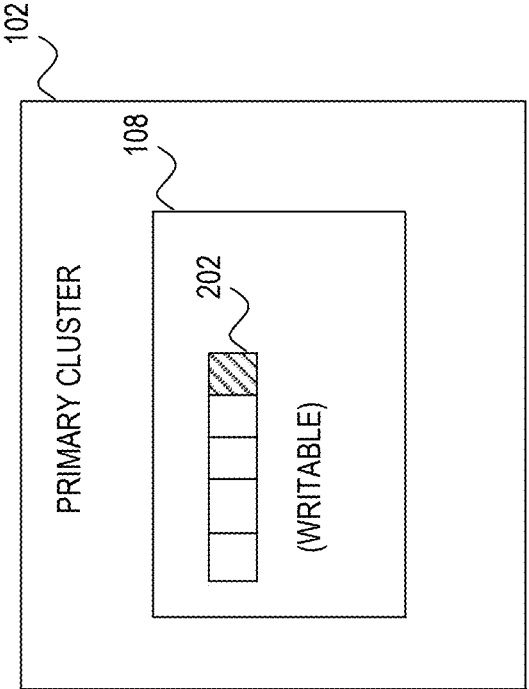

During an unplanned failover, the primary cluster 102 unexpectedly goes down, for example, due to a network outage. All the topics and applications 112 are then failed over to the secondary cluster 104. FIG. 2 illustrates the distributed streaming architecture in the unplanned failover stage, in accordance with example embodiments. As shown, the applications 112 are now writing to the secondary topic 110 in the secondary cluster 104.

Also shown in FIG. 2, the primary cluster 102 is back up and running. Thus, the primary topic 108 is now in a Writable state. The primary topic 108 has some records in a partition (illustrated as a slashed box 202) that were written during the unplanned failover process that diverges from the secondary topic 110 in the secondary cluster 104.

After the applications 112 have been failed over to the secondary cluster 104, the mirroring relationship between the primary topic 108 and the secondary topic 110 has been broken. To reestablish the mirroring relationship, a truncate-and-store command is executed on the primary topic 108. With this command, there is a need to ensure that the secondary topic 110 is in a StoppedMirror state with valid stopped log end offsets (LEOs) so that the point where the failover occurs is known. This point will be where truncation will occur at the primary topic 108. Because there is active production from the applications 112, there are additional records in the partitions (illustrated as cross-hashed boxes 204) that are produced beyond the stopped log end offsets in the secondary topic 110.

When a truncate-and-restore command is executed, a DescribeMirrors remote procedure call (RPC) is issued on the secondary cluster 104. Based on the DescribeMirrors RPC, a plurality of checks/validations are performed as will be discussed in further detail below.

Prior to executing the truncate-and-restore command, the user needs to shut down any consumer group or producer applications on the primary topic 108 on the primary cluster 108 by executing corresponding commands. This is because if the DescribeMirrors remote procedure call (RPC) returns successfully (which will be discussed in more detail below), the primary topic 108 will convert from a writable topic (Writable state) to an immutable topic (e.g., an immutable state) such that the primary topic 108 will not be able to accept any produce requests. Additionally, having consumer groups actively consuming and committing consumer group offsets on the primary topic 108 may cause issues during a later restoration process when there is a need to alter consumer group offsets to clamp them to be the log end offsets that the partition is truncated to. As such, having any extraneous consumer groups running on the primary cluster 102 during this time will cause the restoration to take longer since there cannot be concurrent modifications to consumer group offsets.

In embodiments where both the primary topic 108 and the secondary topic 110 are in a StoppedMirror state, caution must be taken to choose the correct topic for restoration. If the wrong topic is chosen, then all new data that is being written to that topic can be lost and truncated away. To account for these embodiments, a new field is added that is a monotonically increasing integer for a lifetime of a mirror topic called StoppedMirrorTopicSequenceNumber (also referred to herein as "sequence number" or "stopped sequence number"). The sequence number will increase every time the mirror topic has moved to a Stopped state (e.g., during a failover, converting from read only to read/write). When creating a mirror topic or converting a topic to a mirror topic (e.g., during the reversal operation or the truncate operation), the stopped sequence number is fetched from a source topic and copied over to the mirror topic (e.g., set to whatever the source topic's sequence number is). In some embodiments, the stopped sequence number is obtained via the DescribeMirror RPC that is issued in response to execution of the truncate-and-restore command. In alternative embodiments, an additional DescribeMirrors request or RPC is issued to obtain the stopped sequence number. If the source topic is not a mirror topic or does not have a stopped sequence number, the default starting sequence number is set to zero. The use of the above discussed stopped sequence number involves adding a new field called stoppedSequenceNumber to existing mirror topic state definitions, as well as modifying the DescribeMirrors and AlterMirrors request/response schema to account for this new field.

Any time the truncate-and-restore command is executed, the sequence number of the primary topic 108 is compared to a sequence number of the corresponding secondary topic 110. If the sequence number of the primary topic 108 is lower than the sequence number of the secondary topic 110, then it is safe to proceed with a truncation operation since the last stopped topic was the secondary topic 110. However, if the sequence number of the primary topic 108 is higher, then it is not safe to perform the truncate operation and the corresponding request is rejected. If the sequence numbers are equal, there is likely an error or bug and the corresponding request is also rejected. Thus, the sequence number is a mechanism to ensure that the correct topic is restored and prevents potential error.

Figure 3:
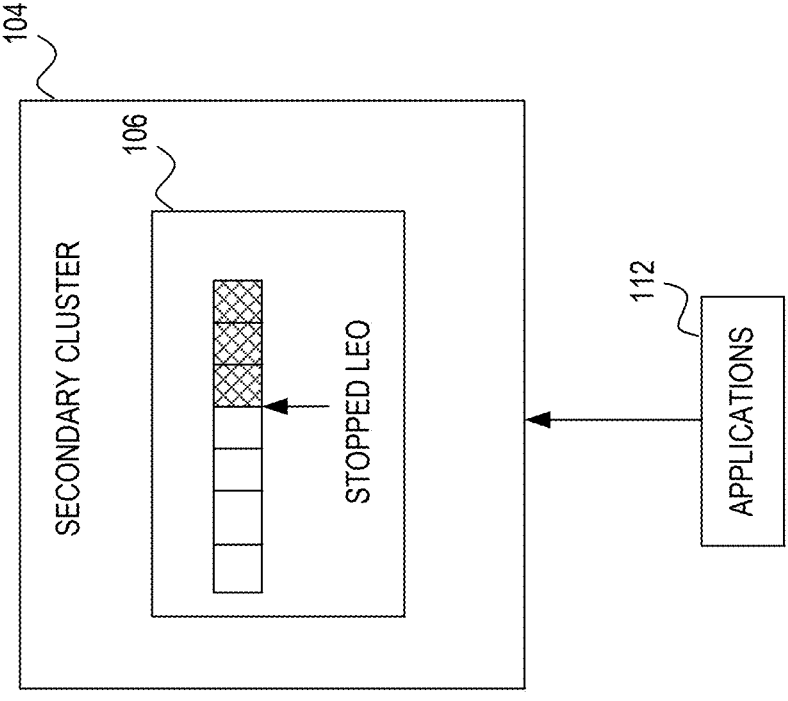
FIG. 3 is a diagram of a stage of the failback process in which a primary topic is in pending setup for restore state, according to some example embodiments.
Figure 3:
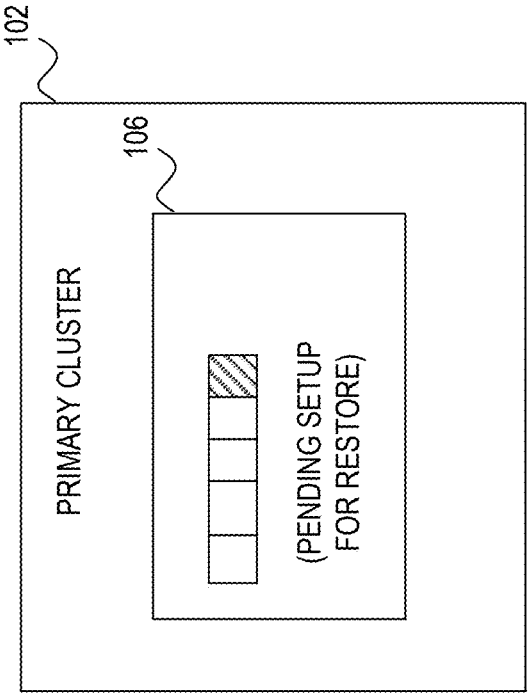

Based on the execution of the truncate-and-restore command, the primary topic 108 is converted to a PendingSetupForRestoreMirror state. FIG. 3 is a diagram of a stage of the failback process in which the primary topic 108 is in pending setup for restore state, according to some example embodiments. This state is a read-only mirror topic state in which produce requests cannot be accepted. Thus, the primary topic 108 is no longer writable.

To ensure it is safe to convert the primary topic 108 to the PendingSetupForRestoreMirror state, the above-discussed describeMirrors RPC is made to the corresponding secondary topic 110 on the secondary cluster 104. With this call, validation is performed. First, there is a check that the corresponding secondary topic 110 is a mirror topic. Secondly, there is a check that the corresponding secondary topic 110 is in a StoppedMirror state. Thirdly, there is a check that source topic identifier of the corresponding secondary topic 110 is the same as a local topic identifier of the primary topic 108. Finally, there is a check that the secondary topic 110 has valid stopped log end offsets. Based on these checks all being valid, the primary topic is transitioned to a PendingSetupForRestoreMirror state. However, if one or more the checks are invalid, then the state is not changed on the primary topic 108 and an exception is returned to the user.

When setting the primary topic 108 to the PendingSetupForRestoreMirror state, truncation offsets (TruncationOffsets) are persisted to be whatever the retrieved stopped log end offsets and epoch are from the secondary cluster 104. A new background task can be executed. This new background task performs a periodic remote call of OffsetForLeaderEpochRequest to the secondary cluster 104 to obtain the stopped log end offsets and epoch (OffsetAndEpoch) for specific partitions in the corresponding secondary topic 110. The offsets of the secondary topic 110 need to be checked as it is more accurate to use the secondary topic's offsets for the specific epoch as the secondary topic 110 is seen as the source of truth. Once the stopped log end offsets and epoch are received, a verification is performed to determine if the offset exists for the specific epoch in the partition on the secondary cluster 104. If it does exist, then this epoch is used for the mirrorStartOffsets in the PendingRestoreMirror state. If it does not exist, the persisted offset is used in the truncationOffsets in the PendingSetupForRestoreMirror state. Once all the mirrorStartOffsets are determined and before shutting down the background task, the primary topic 108 is transitioned from the PendingSetupForRestoreMirror state to PendingRestoreMirror state with correct MirrorStartOffsets based on what has been derived.

Figure 4:
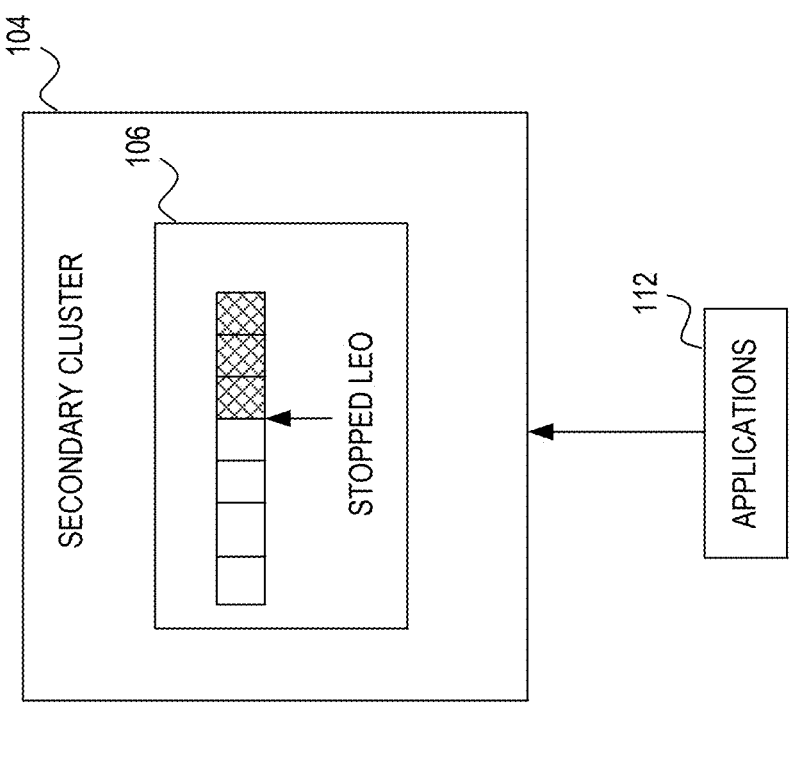
FIG. 4 is a diagram of a stage of the failback process in which truncation occurs, according to example embodiments.
Figure 4:
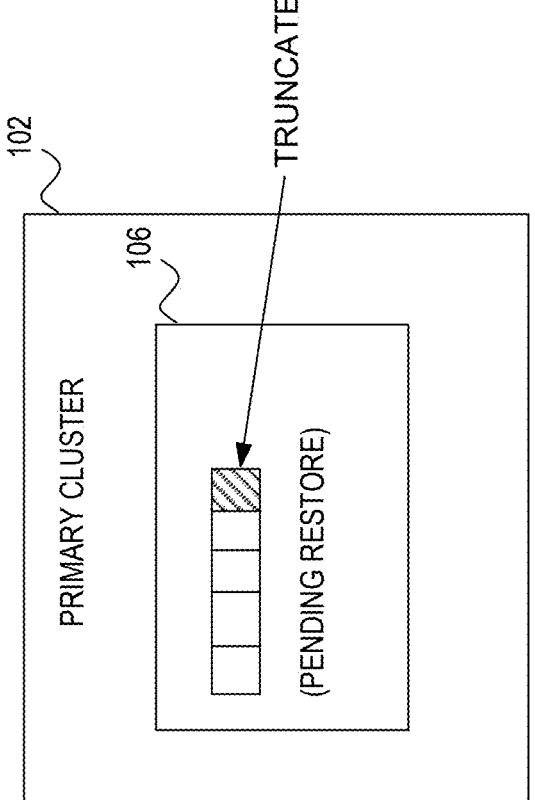

FIG. 4 is a diagram of a stage of the failback process in which truncation occurs, according to example embodiments. After the primary topic 108 is transitioned to the PendingRestoreMirror state, the truncation process is initiated. The truncation process truncates partitions at the primary topic 108 to the appropriate log end offsets (e.g., to whatever the stopped log end offsets are at the corresponding secondary topic 110). Additionally, the consumer group offsets associated with these topic partitions can be clamped to be the minimum of the persisted consumer group offset or the truncated log end offset. If any of the consumer group offsets are ahead of the primary partition's log end offsets, they are altered so that they are clamped to be, at maximum, the partition's log end offsets.

Figure 5:
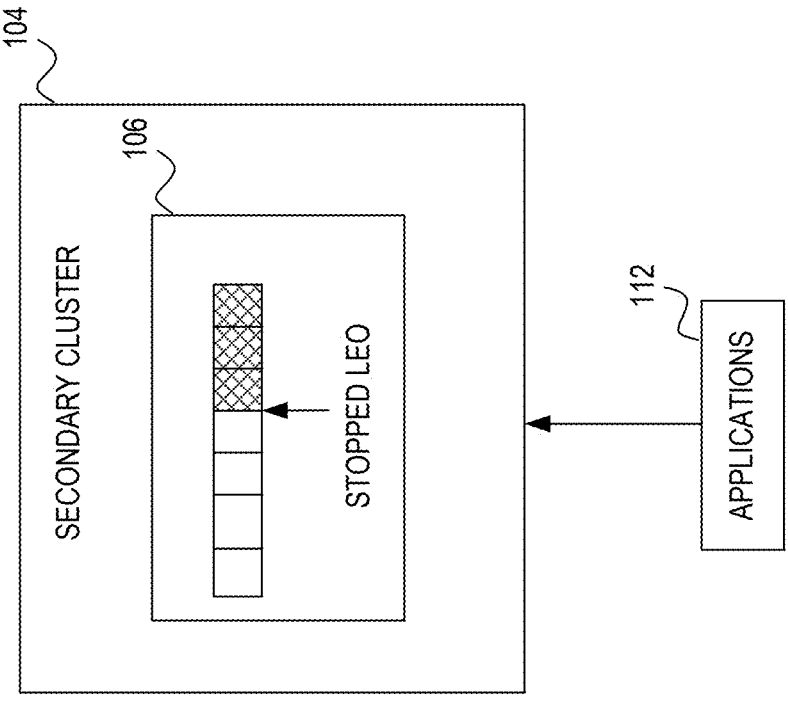
FIG. 5 is a diagram of a stage of the failback process after truncation, according to example embodiments.
Figure 5:
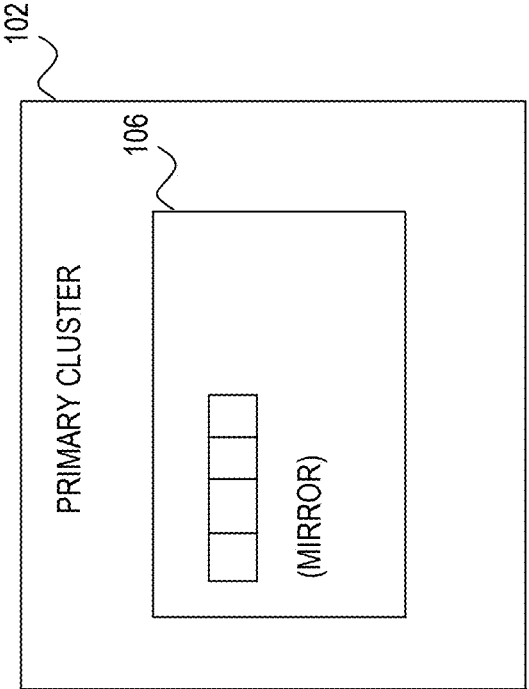

Upon completion of the truncation process, the primary topic 108 will have the same data as the secondary topic 110 up to when new data is written to the secondary topic 110. FIG. 5 is a diagram of a stage of the failback process after truncation, according to example embodiments.

As an alternative embodiment, instead of or in addition to truncating the records at the primary topic 108, the records can be written out to a dead letter queue topic. This can be triggered by a RPC call where, before truncating the log, the divergent records are written out to a special internal topic.

Figure 6:
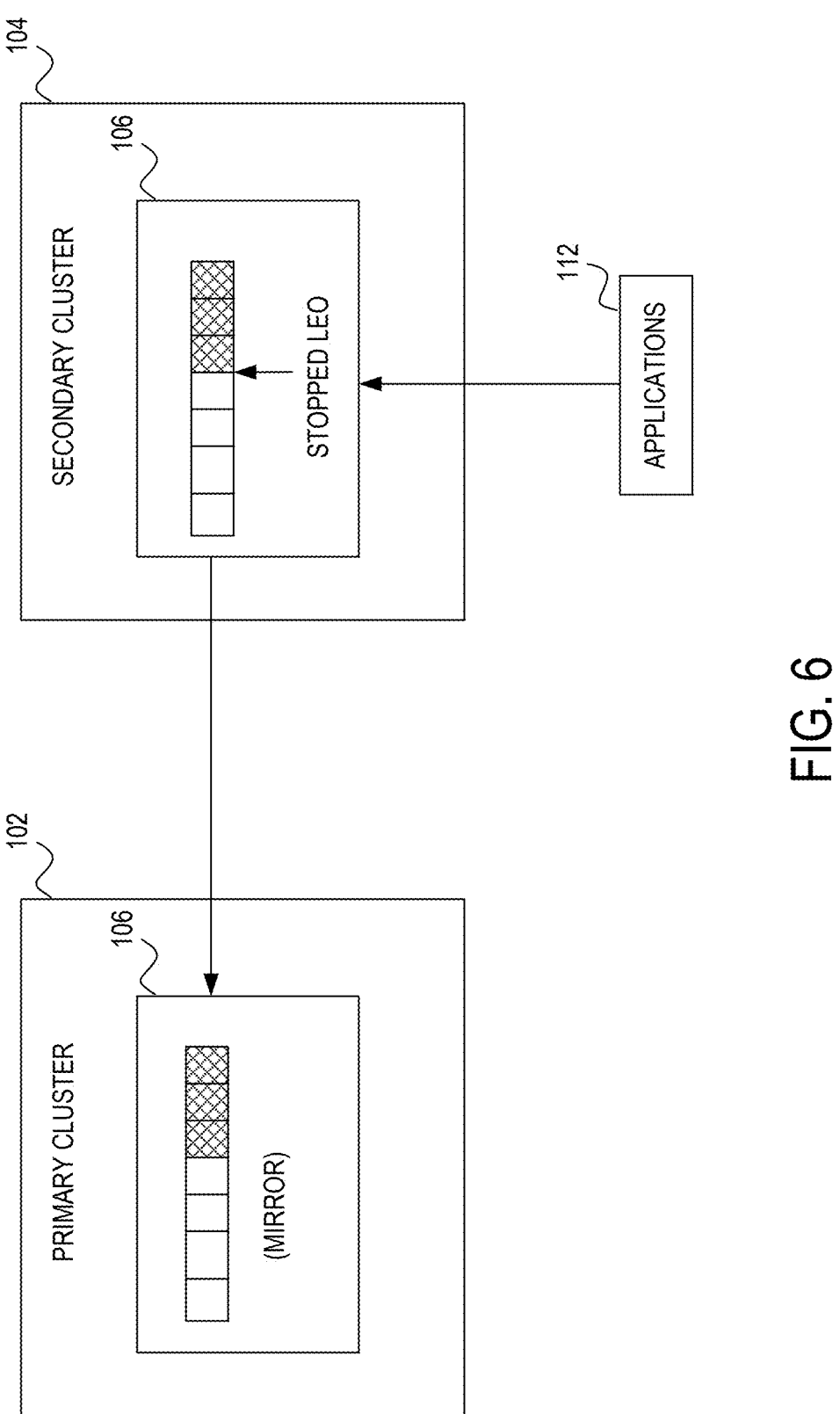
FIG. 6 is a diagram of a stage of the failback process in which the primary topic mirrors data from a secondary topic, according to example embodiments.

Once all partitions are truncated at the correct log end offset at the primary topic 108 and the appropriate consumer group offsets are clamped, the primary topic 108 is converted from the PendingRestoreMirror state to a Mirror state via an internal RPC and a restoration process performed. The primary topic 108 starts to actively mirror from the last failed over point. At this point, the user can start up their consumer group applications and resume committing consumer group offsets. FIG. 6 is a diagram of a stage of the failback process in which the primary topic 108 mirrors the new data from the secondary topic 110, according to example embodiments.

Figure 7:
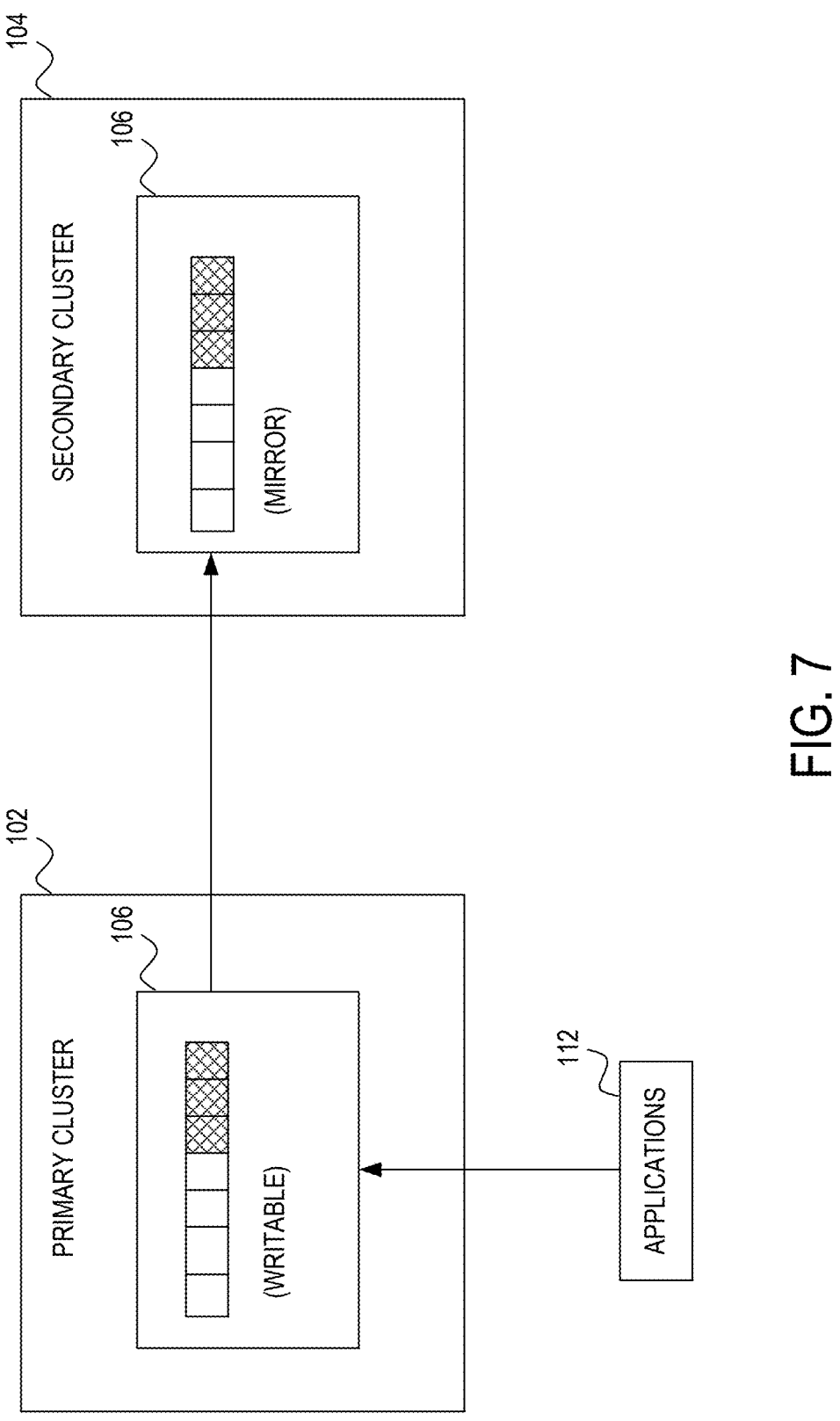
FIG. 7 is a diagram of a stage of the failback process in which the operations are reversed, according to example embodiments.

Once the primary topic 108 has completed mirroring all the new data (e.g., zero mirror lag) or almost all of the new data, a reverse-and-start command or a reverse-and-pause command can be executed to switch the direction of the mirroring flow and fully fail back to the primary cluster 102. The reversal operation will transition the primary topic 108 from the Mirror state to a Writable state. With the reverse-and-start command, the secondary cluster 104 will have its mirror (secondary) topic 110 activated immediately for mirroring. With the reverse-and-pause command, the secondary topic 110 on the secondary cluster 104 will be in a PausedMirror state, and the user will have to (when they are ready to activate the mirroring) issue a resume-mirror command on the secondary topic 110. FIG. 7 is a diagram of a final stage of the failback process in which the operations are reversed, according to example embodiments.

It is noted that in embodiments where the primary topic 108 does not have extra data written after the failover, the truncation process is not performed and only the restoration process is performed.

Some embodiments may involve compacted topics or topics with different retention times. This can result in missing data in the log or truncation of more than just the excess records on the primary cluster 102. In the case of topics with different retention times, there is a best effort attempt to determine the epoch that matches the stopped log end offsets. If the epoch cannot be determined due to the fact that it got truncated away on the secondary cluster 104 (e.g., because of different retention times), the stopped log end offsets are used for truncation. This can result in truncating more than just the divergent records written on the primary cluster 102. However, this can be acceptable because the example embodiments are not a zero data loss restoration process and whatever was truncated away can be mirrored back from the secondary cluster 104.

Similarly, there can be issues with compacted topics where a key-value pair in question can have gotten compacted away. In this case, there can be some missing data in the log of a restored mirror topic (e.g., some offsets in the log are empty and have no messages). This can also be acceptable as example embodiments are not required to be a zero data loss solution.

Figure 8:
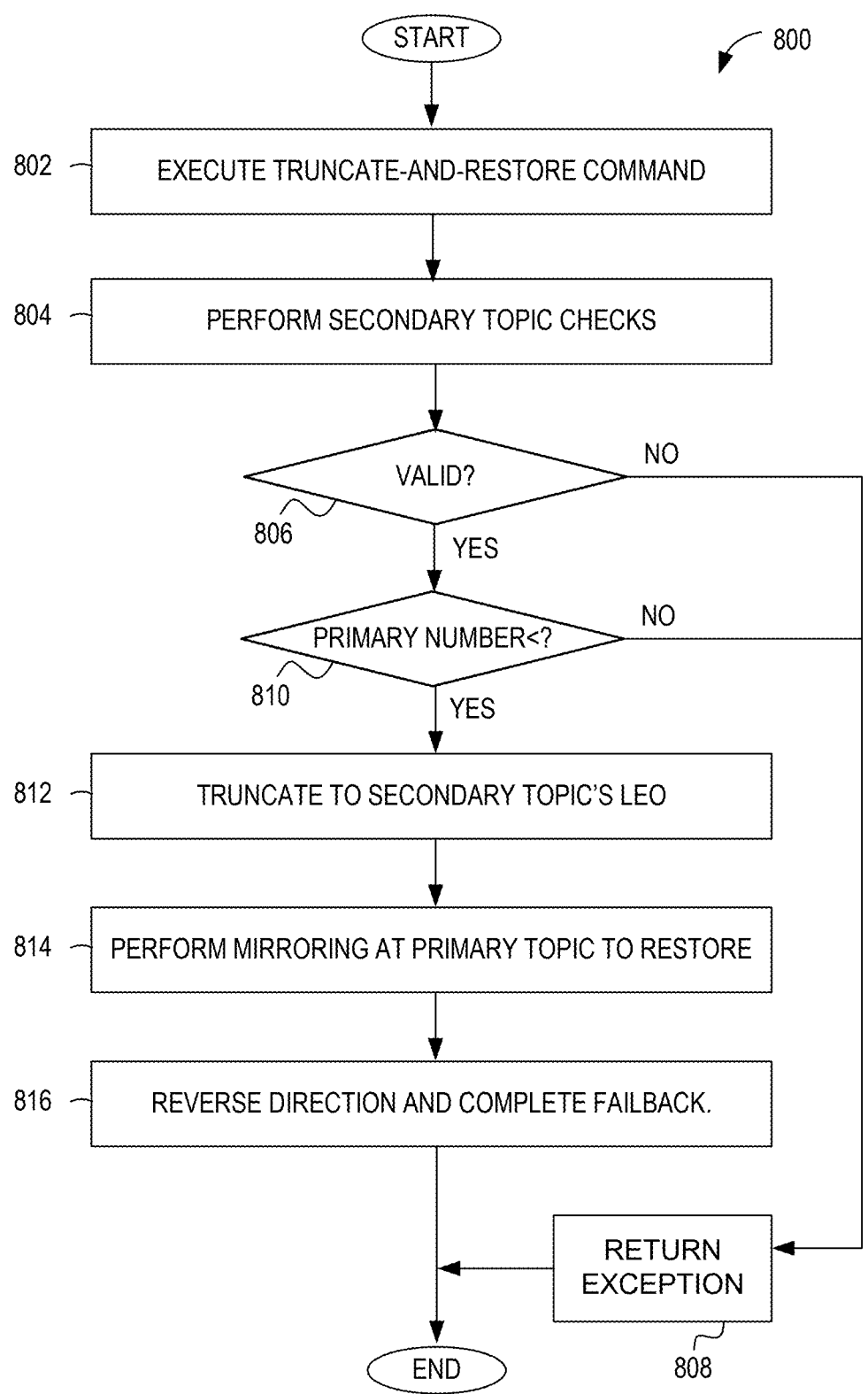
FIG. 8 is a flowchart illustrating operations of a method for performing the failback after the unplanned failover, according to some example embodiments.

FIG. 8 is a flowchart illustrating operations of a method 800 for performing the failback after an unplanned failover, according to some example embodiments. Operations in the method 800 may be performed by the components in the network environment described above with respect to FIG. 1-FIG. 7. Accordingly, the method 800 is described by way of example with reference to components in the network environment. However, it shall be appreciated that at least some of the operations of the method 800 may be deployed on various other hardware configurations or be performed by similar components. Therefore, the method 800 is not intended to be limited to these components.

Initially, production is stopped at the primary cluster 102 after it starts back up after an unplanned failover. A truncate-and-restore command is then executed, in operation 802, on the primary topic 108 of the primary cluster 102. With this command, there is a need to ensure that the corresponding secondary topic 110 is in a StoppedMirror state with valid stopped log end offsets (LEOs) so that the point where the failover occur is known. This point will be where truncation will occur at the primary topic 108.

In operation 804, a plurality of secondary topic checks are performed. In example embodiments, a DescribeMirrors remote procedure call (RPC) is issued on the secondary cluster 104. Based on the DescribeMirrors RPC, a plurality of checks/validations are performed at the secondary topic 110. First, there is a check that the corresponding secondary topic 110 is a mirror topic. Secondly, there is a check that the corresponding secondary topic 110 is in a StoppedMirror state. Thirdly, there is a check that a source topic identifier of the corresponding secondary topic 110 is the same as a local topic identifier of the primary topic 108. Finally, there is a check that the secondary topic 110 has valid stopped log end offsets.

In operation 806, a determination is made whether all the checks are valid. If one or more of the checks fail, then the method 800 proceeds to operation 808 in which the state is not changed and an exception is returned to the user. However, if all the checks are valid, then the primary topic 108 is set to a PendingRestoreMirror state and the method 800 proceeds to operation 810.

In operation 810, a determination is made whether a sequence number of the primary topic 108 is lower than a sequence number of the secondary topic 110. If the sequence number of the primary topic 108 is lower than the sequence number of the secondary topic 110, then it is safe to proceed with a truncation operation since the last stopped topic was the secondary topic 110. However, if the sequence number of the primary topic 108 is higher, then it is not safe to perform the truncation operation and the corresponding request is rejected. If the sequence numbers are equal, there is likely an error or bug and the corresponding request is also rejected. In cases where the sequence number of the primary topic 108 is higher or equal, an exception can be returned in operation 808.

In operation 812, the primary topic 108 is truncated. In example embodiments, a truncation process truncates partitions at the primary topic 108 to appropriate log end offsets that correspond to whatever the stopped log end offsets are at the corresponding secondary topic 110. Additionally, the consumer group offsets associated with these topic partitions can be clamped to be the minimum of the persisted consumer group offset or the truncated log end offset.

In operation 814, mirroring is performed at the primary topic 108. In example embodiments, once all partitions are truncated at the correct log end offset at the primary topic 108 and the appropriate consumer group offsets are clamped, the primary topic 108 is converted from a PendingRestoreMirror state to a Mirror state via an internal RPC. The primary topic 108 then starts to actively mirror from the last failed over point from the secondary topic 110.

Once the primary topic 108 has completed mirroring all the new data (e.g., zero mirror lag) or almost all of the new data, the direction of the mirroring can be reversed and failback is completed in operation 816. In example embodiments, a reverse-and-start command or a reverse-and-pause command is executed to switch the direction of the mirroring flow and fully failback to the primary cluster 102. The reversal operation will transition the primary topic 108 from the Mirror state to a Writable state. With the reverse-and-start command, the secondary cluster 104 will have its mirror (secondary) topic 110 activated immediately. With the reverse-and-pause command, the secondary topic 110 on the secondary cluster 104 will be in a PausedMirror state, and the user needs to issue a resume-mirror command on the secondary topic 110 to resume mirroring.

For simplicity of discussion, example embodiments have been discussed with a single topic in each of the primary and secondary clusters 102 and 104. It is noted that any number of topics can exist in the primary and secondary clusters 102 and 104 and that the operations discussed herein can be applied to one or more of the topics in each of the primary and secondary clusters 102 and 104 (e.g., a subset of topics in each cluster, all topics in the link). Thus, for example, a subset of the topics can be involved in the failback process discussed above. When multiple topics are being failed back, each topic performs the above discussed operations separately.

Figure 9:
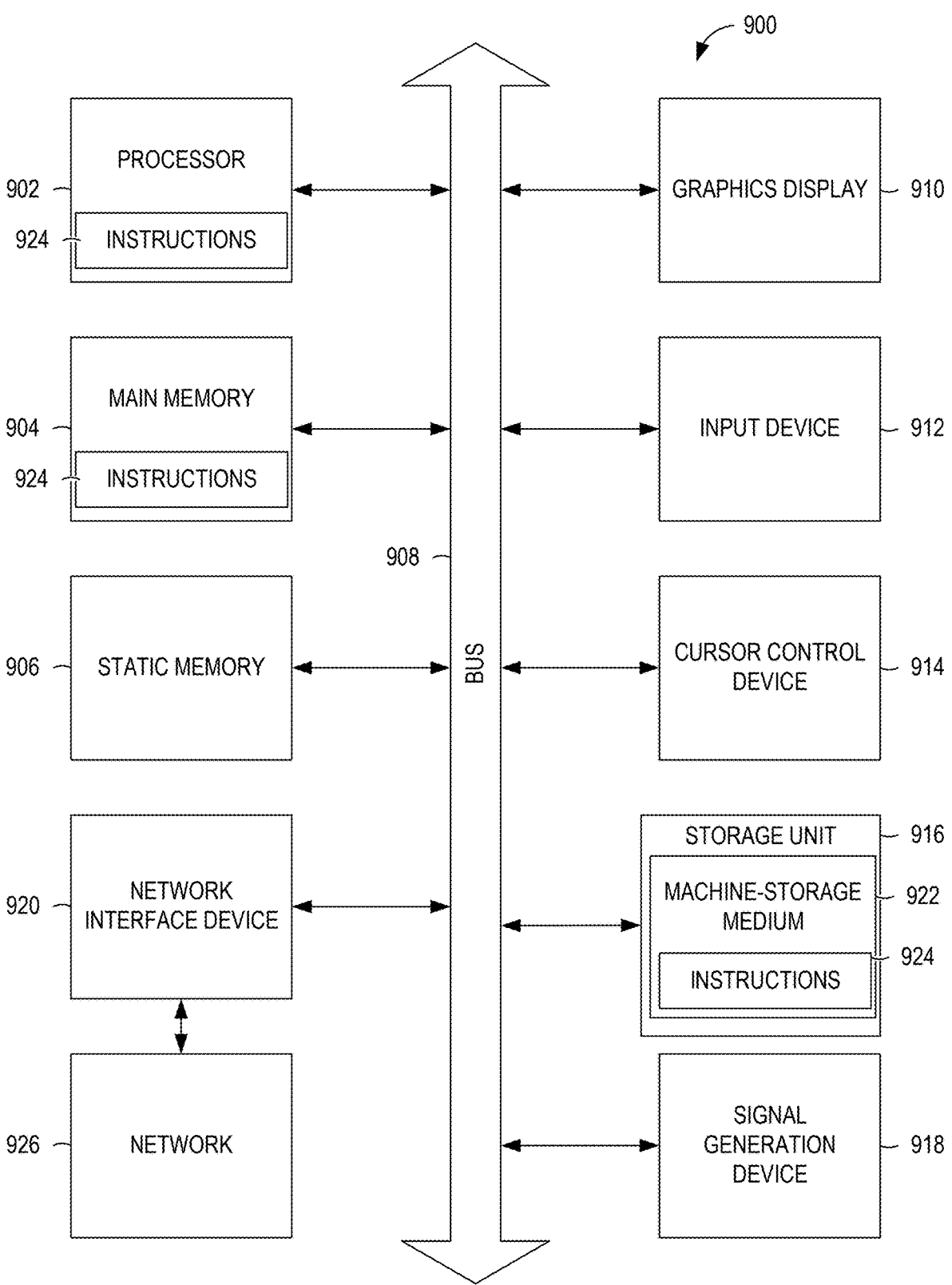
FIG. 9 is a block diagram illustrating components of a machine, according to some example embodiments, able to read instructions from a machine-storage medium and perform any one or more of the methodologies discussed herein.

FIG. 9 illustrates components of a machine 900, according to some example embodiments, that is able to read instructions from a machine-storage medium (e.g., a machine-storage device, a non-transitory machine-storage medium, a computer-storage medium, or any suitable combination thereof) and perform any one or more of the methodologies discussed herein. Specifically, FIG. 9 shows a diagrammatic representation of the machine 900 in the example form of a computer device (e.g., a computer) and within which instructions 924 (e.g., software, a program, an application, an applet, an app, or other executable code) for causing the machine 900 to perform any one or more of the methodologies discussed herein may be executed, in whole or in part.

For example, the instructions 924 may cause the machine 900 to execute the flow diagram of FIG. 8. In one embodiment, the instructions 924 can transform the general, non-programmed machine 900 into a particular machine (e.g., specially configured machine) programmed to carry out the described and illustrated functions in the manner described.

In alternative embodiments, the machine 900 operates as a standalone device or may be connected (e.g., networked) to other machines. In a networked deployment, the machine 900 may operate in the capacity of a server machine or a client machine in a server-client network environment, or as a peer machine in a peer-to-peer (or distributed) network environment. The machine 900 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 924 (sequentially or otherwise) that specify actions to be taken by that machine. Further, while only a single machine is illustrated, the term "machine" shall also be taken to include a collection of machines that individually or jointly execute the instructions 924 to perform any one or more of the methodologies discussed herein.

The machine 900 includes a processor 902 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 904, and a static memory 906, which are configured to communicate with each other via a bus 908. The processor 902 may contain microcircuits that are configurable, temporarily or permanently, by some or all of the instructions 924 such that the processor 902 is configurable to perform any one or more of the methodologies described herein, in whole or in part. For example, a set of one or more microcircuits of the processor 902 may be configurable to execute one or more modules (e.g., software modules) described herein.

The machine 900 may further include a graphics display 910 (e.g., a plasma display panel (PDP), a light emitting diode (LED) display, a liquid crystal display (LCD), a projector, or a cathode ray tube (CRT), or any other display capable of displaying graphics or video). The machine 900 may also include an input device 912 (e.g., a keyboard), a cursor control device 914 (e.g., a mouse, a touchpad, a trackball, a joystick, a motion sensor, or other pointing instrument), a storage unit 916, a signal generation device 918 (e.g., a sound card, an amplifier, a speaker, a headphone jack, or any suitable combination thereof), and a network interface device 920.

The storage unit 916 includes a machine-storage medium 922 (e.g., a tangible machine-storage medium) on which is stored the instructions 924 (e.g., software) embodying any one or more of the methodologies or functions described herein. The instructions 924 may also reside, completely or at least partially, within the main memory 904, within the processor 902 (e.g., within the processor's cache memory), or both, before or during execution thereof by the machine 900. Accordingly, the main memory 904 and the processor 902 may be considered as machine-storage media (e.g., tangible and non-transitory machine-storage media). The instructions 924 may be transmitted or received over a network 926 via the network interface device 920.

In some example embodiments, the machine 900 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

Executable Instructions and Machine-Storage Medium

The various memories (e.g., 904, 906, and/or memory of the processor(s) 902) and/or storage unit 916 may store one or more sets of instructions and data structures (e.g., software) 924 embodying or utilized by any one or more of the methodologies or functions described herein. These instructions, when executed by processor(s) 902 cause various operations to implement the disclosed embodiments.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage medium or media, computer-storage medium or media, and device-storage medium or media 922 specifically exclude carrier waves, modulated data signals, and other such media, at least some of which are covered under the term "signal medium" discussed below. In this context, the machine-storage medium is non-transitory.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The instructions 924 may further be transmitted or received over a communications network 926 using a transmission medium via the network interface device 920 and utilizing any one of a number of well-known transfer protocols (e.g., HTTP). Examples of communication networks 926 include a local area network (LAN), a wide area network (WAN), the Internet, mobile telephone networks, plain old telephone service (POTS) networks, and wireless data networks (e.g., Wi-Fi, LTE, and WiMAX networks). The term "transmission medium" shall be taken to include any intangible medium that is capable of storing, encoding, or carrying instructions 924 for execution by the machine 900, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-storage medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

In view of the disclosure above, various examples are set forth below. It should be noted that one or more features of an example, taken in isolation or combination, should be considered within the disclosure of this application

EXAMPLES

Example 1 is a method for seamless failback after an unplanned failover. The method comprises executing a truncate-and-restore command on a primary topic of a primary cluster after the primary cluster becomes operational after the unplanned failover; determining stopped log end offsets of a corresponding secondary topic of a secondary cluster that was failed over to during the unplanned failover; converting the primary topic of the primary cluster to an immutable state; truncating partitions of the primary topic to log end offsets corresponding to the stopped log end offsets of the secondary topic; after the truncating, converting the primary topic to a mirror state and enabling active mirroring of new data written to the corresponding secondary topic after the failover; and at or near zero mirror lag, executing a reverse command to switch a direction of mirroring flow and convert the primary topic to a writable state In example 2, the subject matter of example 1 can optionally include, responsive to executing of the truncate-and-restore command, performing a plurality of checks on the corresponding secondary topic of the secondary cluster, wherein the primary topic is converted to the immutable state based on successful validation of the plurality of checks.

In example 3, the subject matter of any of examples 1-2 can optionally include wherein the plurality of checks comprises one or more of verifying that the secondary topic is a mirror topic; verifying that the secondary topic is in a stopped mirror state; verifying that a source topic identifier of the secondary topic matches a local topic identifier of the primary topic; or confirming that the secondary topic has valid stopped log end offsets.

In example 4, the subject matter of any of examples 1-3 can optionally include comparing a sequence number associated with the primary topic with a sequence number associated with the secondary topic, wherein the truncating occurs based on the sequence number associated with the primary topic being lower than the sequence number associated with the secondary topic.

In example 5, the subject matter of any of examples 1-4 can optionally include wherein the sequence number is a monotonically increasing integer that increments each time a mirror topic transitions to a stopped state.

In example 6, the subject matter of any of examples 1-5 can optionally include clamping consumer group offsets associated with the primary topic to a minimum of a persisted consumer group offset or truncated log end offset.

In example 7, the subject matter of any of examples 1-6 can optionally include wherein the reverse command comprises a reverse-and-start command that immediately transitions the secondary topic to the mirror state after the failback.

In example 8, the subject matter of any of examples 1-7 can optionally include wherein the reverse command comprises a reverse-and-pause command that places the secondary topic in a paused mirror state until a resume-mirror command is executed.

In example 9, the subject matter of any of examples 1-8 can optionally include performing a periodic remote call to the secondary topic to obtain the stopped log end offsets and epochs from the secondary topic.

In example 10, the subject matter of any of examples 1-9 can optionally include writing divergent records to a special internal topic before truncating the primary topic.

Example 11 is a system for seamless failback after an unplanned failover. The system comprises one or more hardware processors and one or more storage components storing instructions that, when executed by the one or more hardware processors, cause the one or more hardware processors to perform operations comprising executing a truncate-and-restore command on a primary topic of a primary cluster after the primary cluster becomes operational after the unplanned failover; determining stopped log end offsets of a corresponding secondary topic of a secondary cluster that was failed over to during the unplanned failover; converting the primary topic of the primary cluster to an immutable state; truncating partitions of the primary topic to log end offsets corresponding to the stopped log end offsets of the secondary topic; after the truncating, converting the primary topic to a mirror state and enabling active mirroring of new data written to the corresponding secondary topic after the failover; and at or near zero mirror lag, executing a reverse command to switch a direction of mirroring flow and convert the primary topic to a writable state.

In example 12, the subject matter of example 11 can optionally include wherein the operations further comprise, responsive to executing of the truncate-and-restore command, performing a plurality of checks on the corresponding secondary topic of the secondary cluster, wherein the primary topic is converted to the immutable topic based on successful validation of the plurality of checks.

In example 13, the subject matter of any of examples 11-13 can optionally include wherein the plurality of checks comprises one or more of verifying that the secondary topic is a mirror topic; verifying that the secondary topic is in a stopped mirror state; verifying that a source topic identifier of the secondary topic matches a local topic identifier of the primary topic; or confirming that the secondary topic has valid stopped log end offsets.

In example 14, the subject matter of any of examples 11-13 can optionally include wherein the operations further comprise comparing a sequence number associated with the primary topic with a sequence number associated with the secondary topic, wherein the truncating occurs based on the sequence number associated with the primary topic being lower than the sequence number associated with the secondary topic.

In example 15, the subject matter of any of examples 11-14 can optionally include wherein the sequence number is a monotonically increasing integer that increments each time a mirror topic transitions to a stopped state.

In example 16, the subject matter of any of examples 11-15 can optionally include wherein the operations further comprise clamping consumer group offsets associated with the primary topic to a minimum of a persisted consumer group offset or truncated log end offset.

In example 17, the subject matter of any of examples 11-16 can optionally include wherein the reverse command comprises a reverse-and-start command that immediately transitions the secondary topic to the mirror state after the failback.

In example 18, the subject matter of any of examples 11-17 can optionally include wherein the reverse command comprises a reverse-and-pause command that places the secondary topic in a paused mirror state until a resume-mirror command is executed.

In example 19, the subject matter of any of examples 11-18 can optionally include wherein the operations further comprise performing a periodic remote call to the secondary topic to obtain the stopped log end offsets and epochs from the secondary topic.

Example 20 is a storage medium comprising instructions which, when executed by one or more hardware processors of a machine, cause the machine to perform operations for seamless failback after an unplanned failover. The operations comprise executing a truncate-and-restore command on a primary topic of a primary cluster after the primary cluster becomes operational after the unplanned failover; determining stopped log end offsets of a corresponding secondary topic of a secondary cluster that was failed over to during the unplanned failover; converting the primary topic of the primary cluster to an immutable state; truncating partitions of the primary topic to log end offsets corresponding to the stopped log end offsets of the secondary topic; after the truncating, converting the primary topic to a mirror state and enabling active mirroring of new data written to the corresponding secondary topic after the failover; and at or near zero mirror lag, executing a reverse command to switch a direction of mirroring flow and convert the primary topic to a writable state.

Some portions of this specification may be presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or oth-erwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for seamless failback after an unplanned failover, the method comprising:

executing a truncate-and-restore command on a primary topic of a primary cluster after the primary cluster becomes operational after the unplanned failover;

responsive to executing the truncate-and-restore command, performing a plurality of checks on a corresponding secondary topic of a secondary cluster that was failed over to during the unplanned failover;

determining stopped log end offsets of the corresponding secondary topic of the secondary cluster;

converting the primary topic of the primary cluster to an immutable state based on successful validation of the plurality of checks;

truncating partitions of the primary topic to log end offsets corresponding to the stopped log end offsets of the corresponding secondary topic;

after the truncating, converting the primary topic to a mirror state and enabling active mirroring of new data written to the corresponding secondary topic after the unplanned failover; and at or near zero mirror lag, executing a reverse command to switch a direction of mirroring flow and convert the primary topic to a writable state.

2. The method of claim 1, wherein the plurality of checks comprises one or more of:

verifying that the corresponding secondary topic is a mirror topic;

verifying that the corresponding secondary topic is in a stopped mirror state;

verifying that a source topic identifier of the corresponding secondary topic matches a local topic identifier of the primary topic; or confirming that the corresponding secondary topic has valid stopped log end offsets.

3. The method of claim 1, further comprising:

comparing a sequence number associated with the primary topic with a sequence number associated with the corresponding secondary topic, wherein the truncating occurs based on the sequence number associated with the primary topic being lower than the sequence number associated with the corresponding secondary topic.

4. The method of claim 3, wherein the sequence number is a monotonically increasing integer that increments each time a mirror topic transitions to a stopped state.

5. The method of claim 1, further comprising:

clamping consumer group offsets associated with the primary topic to a minimum of a persisted consumer group offset or truncated log end offset.

6. The method of claim 1, wherein the reverse command comprises a reverse-and-start command that immediately transitions the corresponding secondary topic to the mirror state after the failback.

7. The method of claim 1, wherein the reverse command comprises a reverse-and-pause command that places the corresponding secondary topic in a paused mirror state until a resume-mirror command is executed.

8. The method of claim 1, further comprising:

performing a periodic remote call to the corresponding secondary topic to obtain the stopped log end offsets and epochs from the corresponding secondary topic.

9. The method of claim 1, further comprising:

writing divergent records to a special internal topic before truncating the primary topic.

10. A system for seamless failback after an unplanned failover, the system comprising:

one or more hardware processors; and one or more storage components storing instructions that, when executed by the one or more hardware processors-

18 sors, cause the one or more hardware processors to perform operations comprising:

executing a truncate-and-restore command on a primary topic of a primary cluster after the primary cluster becomes operational after the unplanned failover;

responsive to executing the truncate-and-restore command, performing a plurality of checks on a corresponding secondary topic of a secondary cluster that was failed over to during the unplanned failover;

determining stopped log end offsets of the corresponding secondary topic of the secondary cluster;

converting the primary topic of the primary cluster to an immutable state based on successful validation of the plurality of checks;

truncating partitions of the primary topic to log end offsets corresponding to the stopped log end offsets of the corresponding secondary topic;

after the truncating, converting the primary topic to a mirror state and enabling active mirroring of new data written to the corresponding secondary topic after the unplanned failover; and at or near zero mirror lag, executing a reverse command to switch a direction of mirroring flow and convert the primary topic to a writable state.

11. The system of claim 10, wherein the plurality of checks comprises one or more of:

verifying that the corresponding secondary topic is a mirror topic;

verifying that the corresponding secondary topic is in a stopped mirror state;

verifying that a source topic identifier of the corresponding secondary topic matches a local topic identifier of the primary topic; or confirming that the corresponding secondary topic has valid stopped log end offsets.

12. The system of claim 10, wherein the operations further comprise:

comparing a sequence number associated with the primary topic with a sequence number associated with the corresponding secondary topic, wherein the truncating occurs based on the sequence number associated with the primary topic being lower than the sequence number associated with the corresponding secondary topic.

13. The system of claim 12, wherein the sequence number is a monotonically increasing integer that increments each time a mirror topic transitions to a stopped state.

14. The system of claim 10, wherein the operations further comprise:

clamping consumer group offsets associated with the primary topic to a minimum of a persisted consumer group offset or truncated log end offset.

15. The system of claim 10, wherein the reverse command comprises a reverse-and-start command that immediately transitions the corresponding secondary topic to the mirror state after the failback.

16. The system of claim 10, wherein the reverse command comprises a reverse-and-pause command that places the corresponding secondary topic in a paused mirror state until a resume-mirror command is executed.

17. The system of claim 10, wherein the operations further comprise:

performing a periodic remote call to the corresponding secondary topic to obtain the stopped log end offsets and epochs from the corresponding secondary topic.

18. A machine-storage medium comprising instructions which, when executed by one or more hardware processors of a machine, cause the machine to perform operations for seamless failback after an unplanned failover, the operations comprising:

executing a truncate-and-restore command on a primary topic of a primary cluster after the primary cluster becomes operational after the unplanned failover;

responsive to executing the truncate-and-restore command, performing a plurality of checks on a corresponding secondary topic of a secondary cluster that was failed over to during the unplanned failover;

determining stopped log end offsets of the corresponding secondary topic of the secondary cluster;

converting the primary topic of the primary cluster to an immutable state based on successful validation of the plurality of checks;

truncating partitions of the primary topic to log end offsets corresponding to the stopped log end offsets of the corresponding secondary topic;

after the truncating, converting the primary topic to a mirror state and enabling active mirroring of new data written to the corresponding secondary topic after the unplanned failover; and at or near zero mirror lag, executing a reverse command to switch a direction of mirroring flow and convert the primary topic to a writable state.

* * * * *